March 27, 1962    J. P. PASTERNAK    3,027,536
INSULATION STRIPPING WIRE CONNECTOR
Filed Dec. 5, 1958    5 Sheets-Sheet 1
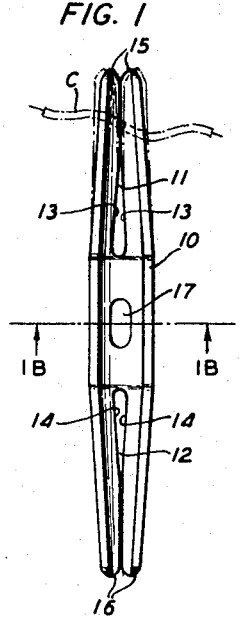
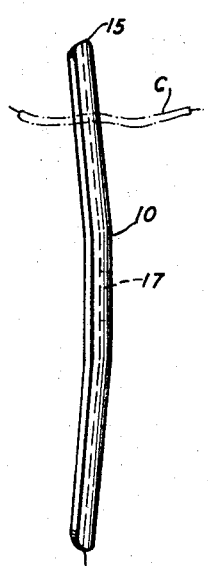
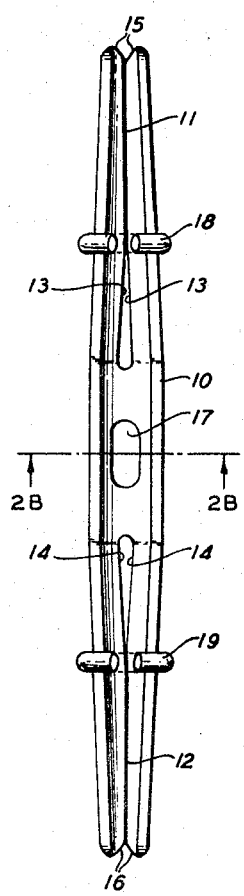
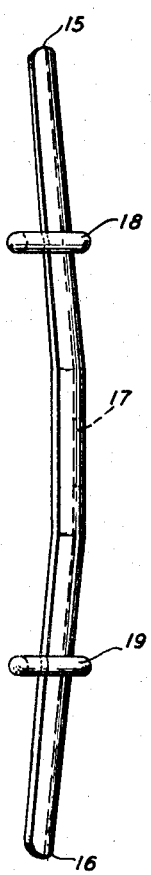
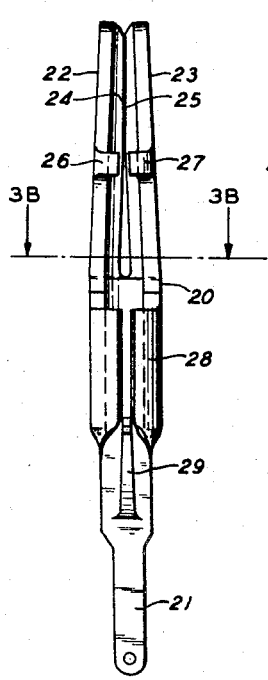
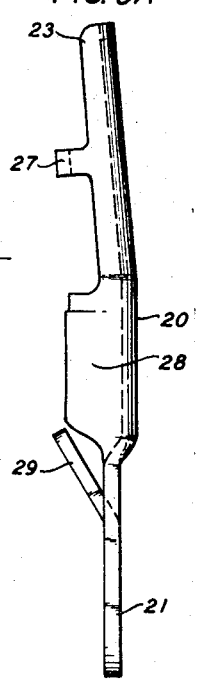
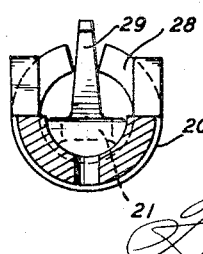
INVENTOR
J. P. PASTERNAK
BY
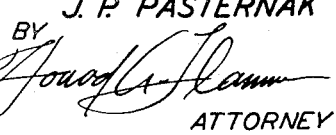
ATTORNEY March 27, 1962 J. P. PASTERNAK 3,027,536
INSULATION STRIPPING WIRE CONNECTOR
Filed Dec. 5, 1958 5 Sheets-Sheet 2

INVENTOR
J. P. PASTERNAK
BY
ATTORNEY

March 27, 1962 J. P. PASTERNAK 3,027,536
INSULATION STRIPPING WIRE CONNECTOR
Filed Dec. 5, 1958 5 Sheets-Sheet 3

INVENTOR
J. P. PASTERNAK
BY
ATTORNEY

March 27, 1962 J. P. PASTERNAK 3,027,536
INSULATION STRIPPING WIRE CONNECTOR
Filed Dec. 5, 1958 5 Sheets-Sheet 4
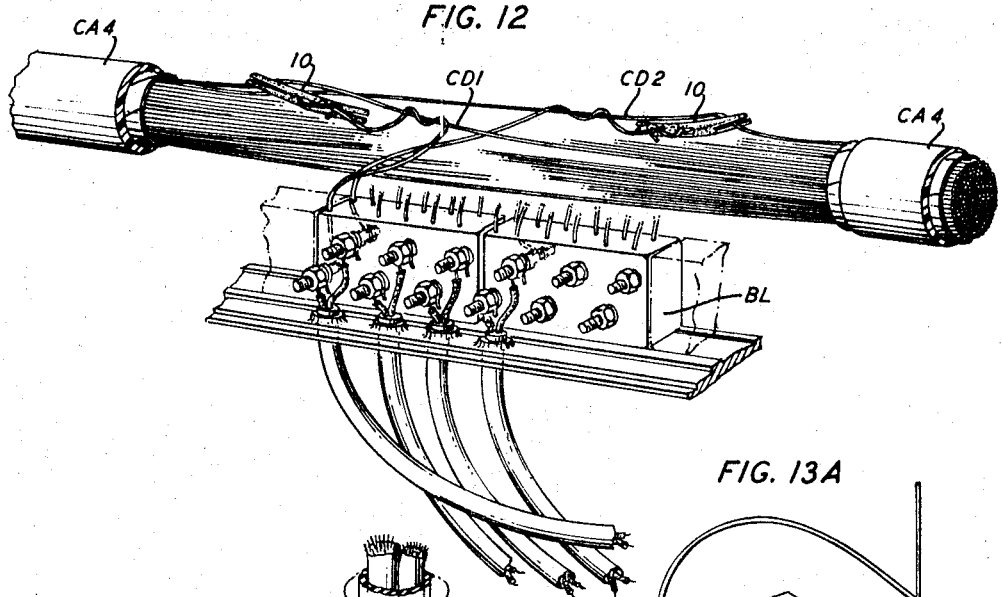
FIG. 12
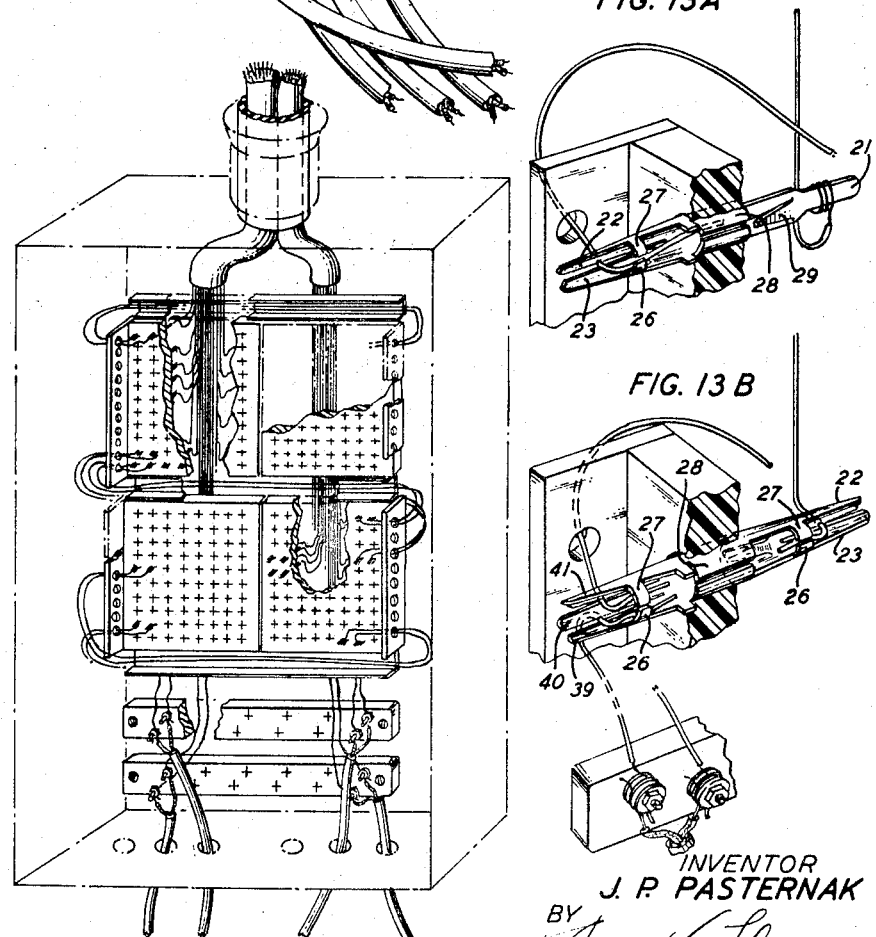
FIG. 13
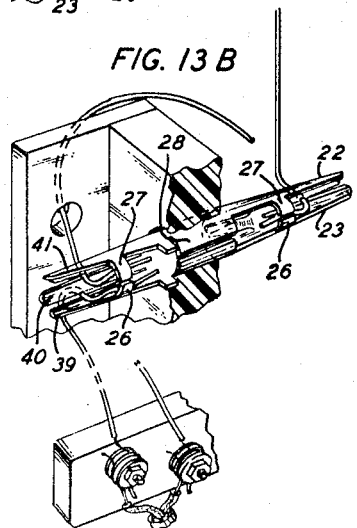
FIG. 13A
FIG. 13B
INVENTOR
J. P. PASTERNAK
BY
ATTORNEY

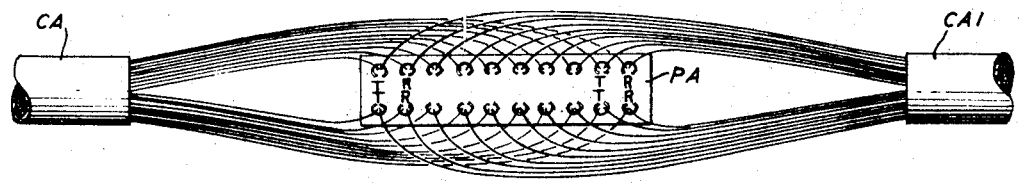
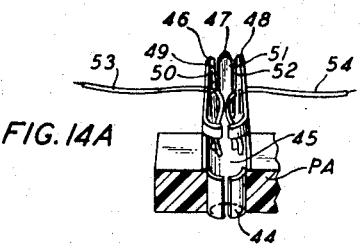
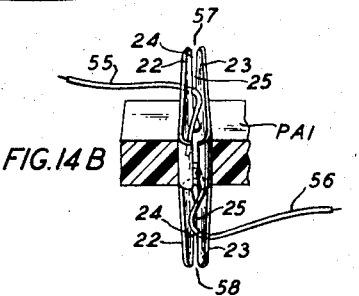
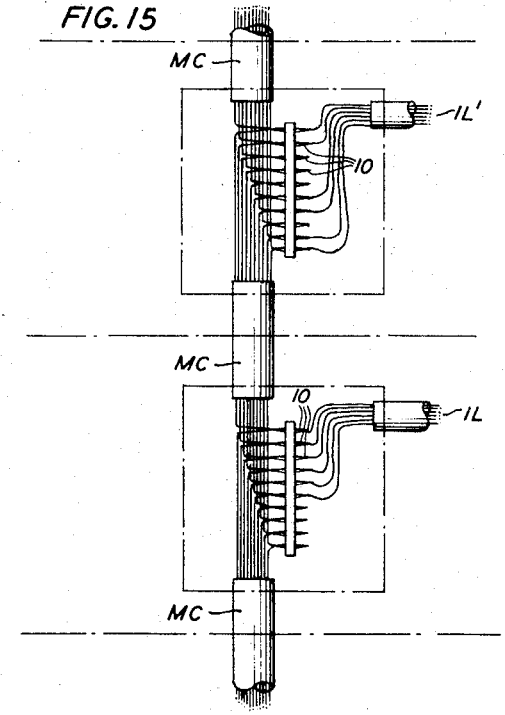
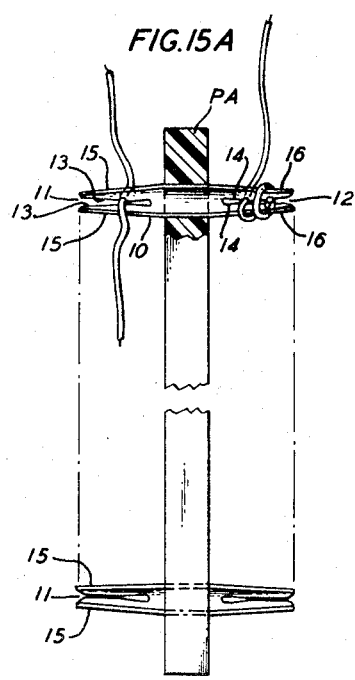

# United States Patent Office 3,027,536
Patented Mar. 27, 1962

3,027,536
INSULATION STRIPPING WIRE CONNECTOR
John P. Pasternak, Plainfield, N.J., assignor to Bell Telephone Laboratories, Incorporated, New York, N.Y., a corporation of New York
Filed Dec. 5, 1958, Ser. No. 778,509
6 Claims. (Cl. 339—97)

This invention relates to wire connectors and more particularly to wire connectors intended for connecting together two or more insulated conductors without removing the insulation therefrom.

An object of the present invention is the provision of a solderless connector for insulated wires wherein the insulation on the conductor is ruptured and connection is established with the metallic electrical conductor which is mechanically strong and of a low electrical resistance.

Another object of the invention is the provision of a solderless connector wherein a plurality of insulated conductors may be joined together by a single connector.

A further object of the invention is the provision of a combined solderless connector and terminal which due to its unique construction readily adapts itself to installation on terminal panels and the like and provides means for connecting a plurality of insulated conductors together.

A still further object of the invention is the provision of a solderless connector which due to its novel construction enables two such connectors to be mechanically coupled together to provide a readily applied and removable electrical connection between insulated conductors.

A still further object of the invention is the provision of a solderless connector for insulated wires having a covering or sheath thereover of insulated material.

The wire connector of this invention is of the solderless type and is intended for securing together and making electrical connections between electrical conductors without the removal of the insulation.

In accordance with the preferred embodiment of my invention, I have provided a unique structure wherein the body or wire receiving portion of the connector is arcuate in cross section and is bifurcated to provide two opposed knife-like edges which may be single- or double-ended, and which may also be arranged for a plurality of insulated conductors at either or both ends.

The opposed edges are in juxtaposition with respect to each other and rounded off to eliminate sharp cutting edges that might injure the conductor as it is forced therebetween. They are, however, sufficiently thin at the point of contact with the wire, are sufficiently close spaced and have a sufficiently strong spring action resisting spreading to rupture the insulation and establish electrical contact with the conductor when the wire is forced between them.

The wire connector of my invention may take the form of a binding post or terminal and may be suitably mounted on a panel or terminal block.

My invention further contemplates the coupling of two of my connectors together to provide means for joining the ends of insulated electrical conductors together which may be readily connected and disconnected.

In order to provide insulation between the adjacent connectors I contemplate the coating or covering of the connector with a thin layer of plastic insulating material, for example, polyvinyl chloride. Since the contacting surfaces of the opposed wire receiving portions are almost touching, the coating on these surfaces will be removed as the wire is inserted and will not in any way affect the establishing of a low resistance connection with the conductor.

The invention will be more clearly understood from the following detailed description when read in connection with the following drawing in which:

FIG. 1 is a front elevational view of the connector of this invention with a conductor positioned therein;
FIG. 1A is a side elevational view of the connector shown in FIG. 1;
FIG. 1B is a cross-sectional view taken on line 1B—1B of FIG. 1;
FIG. 2 is a front elevational view of a modified form of my invention wherein I have provided reinforcing rings which embrace the bifurcated portion and also act as optimum location stops for the conductor;
FIG. 2A is a side elevational view of the connector shown in FIG. 2;
FIG. 2B is a cross-sectional view taken on line 2B—2B of FIG. 2;
FIG. 3 is a front elevational view of another modified form of my invention wherein I have provided a combined connector and terminal or binding post which is adapted for panel mounting;
FIG. 3A is a side elevational view of the terminal shown in FIG. 3;
FIG. 3B is a cross-sectional view taken on line 3B—3B of FIG. 3;
FIG. 4 is a view similar to FIG. 3 but discloses a reinforcing ring embracing the bifurcated portion;
FIG. 4A is a side elevational view of the terminal shown in FIG. 4;
FIG. 5 is a front elevational view of a further modified form of my invention wherein I provide a terminal, one end of which is bifurcated to provide a plurality of tines between which insulated conductors are intended to be secured and connected together;
FIG. 5A is a side elevational view of the terminal shown in FIG. 5;
FIG. 6 is a front elevational view of a still further modified form of my invention which is somewhat similar to FIG. 3 but provides a plurality of tines between which a plurality of wires may be secured;
FIG. 6A is a side elevational view of the terminal shown in FIG. 6;
FIG. 7 is a front elevational view of a still further modified form of my invention and is similar to the structure shown in FIG. 6 except that I have incorporated therein a reinforcing ring for embracing the tines;
FIG. 7A is a side elevational view of the terminal shown in FIG. 7;
FIG. 8 is an elevational view of a still further modified form of my invention wherein I provide a simple binding post adapted to receive a plurality of wires from one face only of a panel;
FIG. 8A is a side elevational view of the binding post shown in FIG. 8;
FIG. 9 is a front elevational view of a still further modified form of my invention wherein a binding post or terminal is provided so that connections may be made to both the rear and front faces of the panel;
FIG. 9A is a side elevational view of the terminal shown in FIG. 9;
FIG. 10 is a view in perspective and illustrates the connector of my invention coated with insulating material;
FIG. 11 is a fragmentary view illustrating a step in the splicing of a multiconductor cable and illustrates the manner in which the connector of my invention would be utilized to expedite the connection of the individual conductors;
FIG. 12 is a fragmentary view of a multiconductor cable and illustrates how by the use of the connector of my invention connections from a joining block may be made to the conductors in the cable without severing the conductors therein;
FIG. 13 is a perspective view of a cross-connect cable termination for a feeder and distribution cable and illustrates how the binding posts of my invention may be utilized without stripping the insulation from the cable stub conductor ends or the cross-connecting wires or the bridging wires;

FIG. 13A is a fragmentary view of one of the panels in FIG. 13 and illustrates how the binding posts of my invention as shown in FIGS. 3 and 3A facilitate the making of electrical connections to the cable;

FIG. 13B is a fragmentary view of another panel in FIG. 13 and shows how a binding post, similar to that shown in FIGS. 6 and 6A but double-ended, expedites the connections of the conductors involved;

FIG. 14 is a fragmentary view of an opening in a sheathed multiconductor cable with the conductors basketed and connected together by means of the connectors of my invention mounted on a suitable panel;

FIG. 14A is a fragmentary view of the panel shown in FIG. 14 and discloses how the conductors are joined on one side of the panel only;

FIG. 14B is a fragmentary portion of a panel and illustrates how a double-ended terminal similar to that shown in FIGS. 9 and 9A may be utilized when it is desirable to splice wires, one from each side of the panel;

FIG. 15 is a schematic drawing and illustrates how the terminals shown in the various figures may be utilized on a building termination;

FIG. 15A is a fragmentary view and shows in detail how the connections on the panel in FIG. 15 are accomplished.

Figure 4:
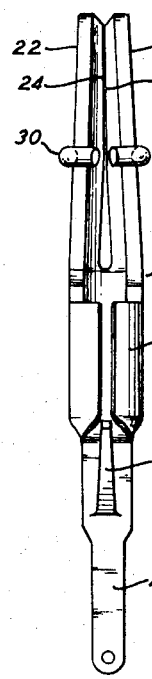

In the embodiment of my invention as depicted in the various figures and with particular reference to FIGS. 1, 1A, 2 and 2A, inclusive, the structure of my solderless connector comprises an elongated body member 10 of substantially arcuate cross section. The member 10 is preferably fabricated from a strong, resilient material, compatible with copper conductors, having a high degree of electrical conductivity such as beryllium copper or the like.

As shown in FIGS. 1 and 1A, the ends of the member 10 are bifurcated to provide the slotted portions 11 and 12.

The inner or opposed surfaces 13—13 and 14—14 and the tines 15—15 and 16—16, converge toward the free end of the tines. As shown, an arcuate cross section is maintained throughout the length of the connector to provide rigidity in all directions coupled with adequate force to establish and maintain a satisfactory electrical connection.

Located at the center of the body portion 10 is an elongated aperture 17 which is used to position the wire end therein when the remaining portion of the wire is forced between the tines 15—15 and 16—16.

As shown in FIG. 1A the connector has a slightly dished configuration the purpose of which is to add strength and to further stabilize the connector. Since the body portion 10 is constructed of strong, resilient metal, the opposed contacting surfaces of portions 11 and 12 will readily rupture the insulation of an insulated conductor when it is forced therebetween and establish electrical contact therewith.

In a modified form of the connector of my invention as shown in FIGS. 2 and 2A, reinforcing ring members 18 and 19 preferably formed of a strong, relatively rigid metal, are positioned over the free ends of the tines 15 and 16. These rings 18 and 19 serve a dual purpose, i.e., to limit the depth to which the conductor can be forced down into the slot and to prevent the undue spreading and weakening of the tines 15 and 16.

As shown in FIGS. 3 and 3A and FIGS. 4 and 4A, I have provided a terminal or binding post suitable for mounting on a panel of insulating material. This terminal incorporates therein the essential parts of my improved wire connector and comprises an elongated body portion 20 having extending therefrom a flat tang or lug portion 21. The arcuate portion is slotted, a portion of its length, to provide the tines 22 and 23 with the opposed contacting surfaces 24 and 25 converging toward the free ends thereof.

As shown in FIGS. 3 and 3A, there are located midway the length of the slot and extending thereover, the inturned ears 26 and 27. These ears serve to limit the distance that the insulated conductors can travel in the slot and also serve to confine the wires therein.

The central portion 28 of the binding post heretofore referred to, is substantially circular in cross section thereby facilitating its mounting in a suitable aperture in a binding post panel.

As shown in FIGS. 3, 3A and 3B, an upstanding lug 29 is provided on the tang 21 to firmly secure the binding post on the panel.

Figure 4A:
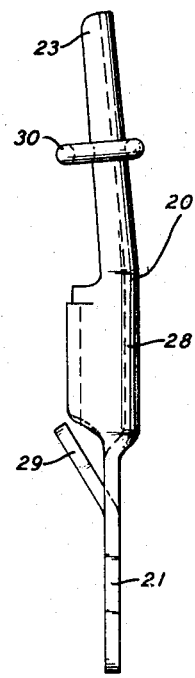

As shown in FIGS. 4 and 4A, the binding post of FIGS. 3 and 3A has been modified to include a reinforcing ring in place of the ears 26 and 27. The purpose of this reinforcing ring has heretofore been described.

Figure 5:
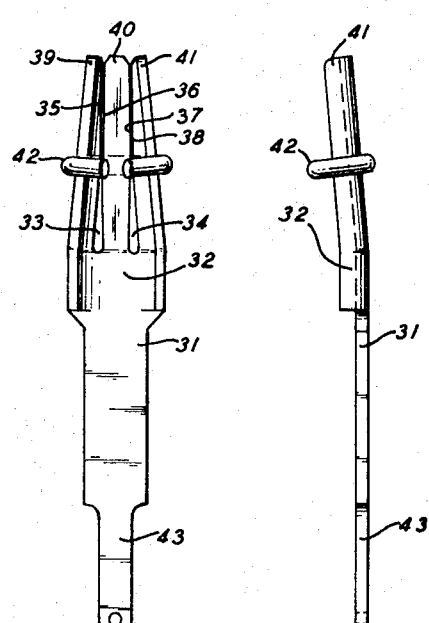
Figure 5A:
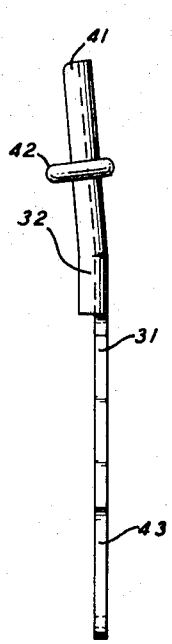

The modified structure as shown in FIGS. 5 and 5A is somewhat similar to the structure previously described and comprises an elongated flat body 31 having extending from one end thereof a bifurcated portion 32. The bifurcated portion 32 is arcuate in cross section and is provided with a plurality of slots 33 and 34, thereby providing opposed contacting surface portions 35, 36, 37 and 38 on the tines. Like the structures previously described, the contacting surfaces converge toward their free ends and a ring 42 is provided which embraces the tines 39, 40 and 41 to maintain them in close contact with the conductor which they engage and to limit the amount of travel of the conductors in the slots. Extending from the opposite end of the member 31 is the lug 43 which is intended to be positioned in a suitable aperture in a binding post panel and used to secure a conductor thereto either by the wrapped or solder method (not shown).

The terminals or binding posts as shown in FIGS. 6, 6A, 7 and 7A are modified forms of the terminals heretofore described. These terminals comprise body portions similar to those described with reference to FIGS. 3, 3A, 4 and 4A and the same reference characters apply with equal force thereto. However, the wire receiving portions differ; for example, in FIGS. 6 and 6A I have combined the wire receiving structure as shown in FIGS. 5 and 5A with the tang portion and central portion of FIGS. 3 and 3A and 4A and have substituted the ears 26 and 27 for the rings 42.

Figure 6:
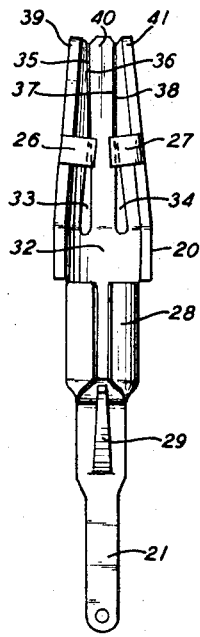
Figure 6A:
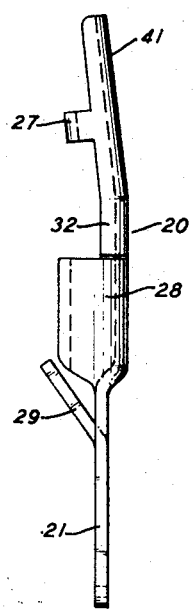
Figure 7:
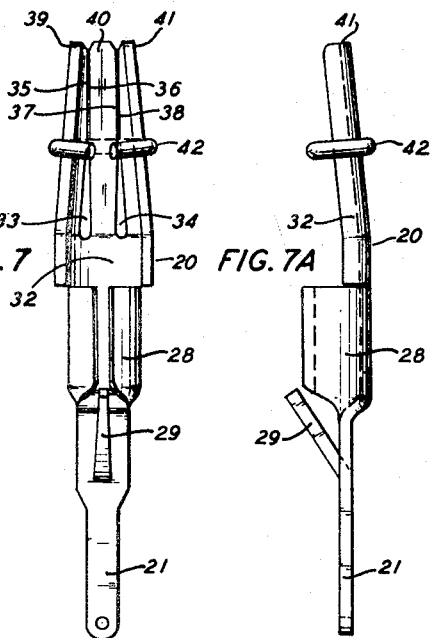
Figure 7A:
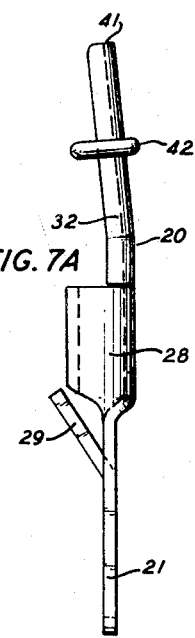

In FIGS. 7 and 7A I have modified the structure of FIGS. 6 and 6A to include the reinforcing ring 42.

Figure 8:
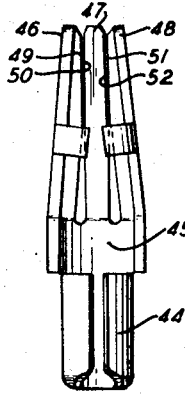
Figure 8A:
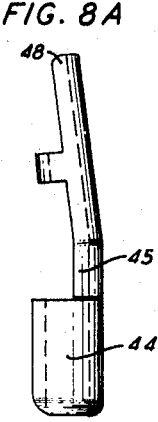

As shown in FIGS. 8 and 8A there is disclosed a terminal or binding post for joining insulated conductors which is intended for panel mounting where access is only available to one side of the panel; for example, in making splices in a multiconductor cable as shown in FIGS. 14 and 14A.

The binding post as shown in FIGS. 8, 8A and 14A has a substantially cylindrical body portion 44 and an extending bifurcated portion 45 of arcuate cross section integral therewith. The bifurcated portion 45 has a plurality of longitudinally extending slots therein to provide for the tines 46, 47 and 48. These tines, like the tines previously described with respect to the other figures, have oppositely disposed contacting surface portions 49, 50, 51 and 52 and are adapted to rupture the insulation on the insulated conductors 53 and 54 as shown in FIG. 14A and make electrical contact therewith.

As shown in FIG. 14, this type of binding post is being utilized on a suitable panel PA to splice the ends of the conductors in the cable CA and CA1 together.

Figure 9:
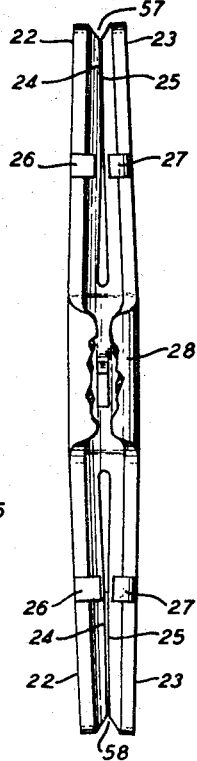
Figure 9A:
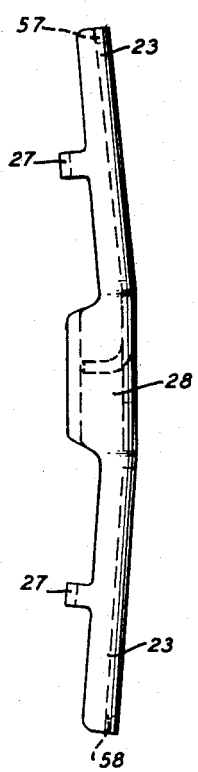

In FIGS. 9 and 9A and FIG. 14B, I have shown an alternative way of splicing the conductor ends 55 and 56 wherein the binding post is mounted through a panel PA1. This terminal or binding post comprises two like ends 57 and 58 each end adapted to receive and embrace the insulated wires in a manner as previously described.

Figure 10:
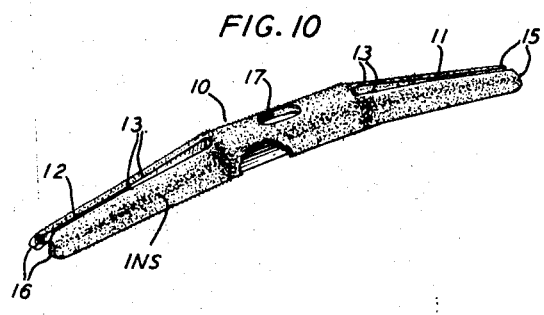

As shown in FIG. 10, the connector 10 of my invention has been coated with a suitable insulating covering INS, for example, polyvinyl chloride.

Figure 11:
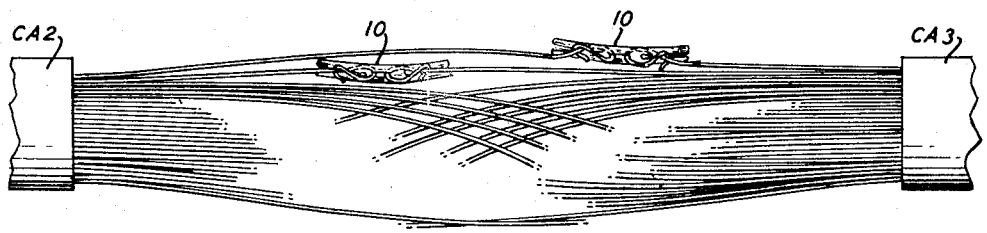

FIG. 11 illustrates the connector of my invention, and preferably the one disclosed in FIG. 10, being utilized for joining the individual conductors of a multiconductor cable CA2 and CA3.

In FIG. 12 I have shown the connector disclosed in the various figures being utilized to connect telephone subscribers' terminals on the block BL to the insulated conductors in the cable CA4 without severing the conductors CD1 and CD2 in the cable CA4.

In FIGS. 13, 13A, 13B and FIGS. 15 and 15A I have shown the practical application of the terminal of my invention and how considerable space may be saved in the construction of a cable termination using my novel type of connector and binding post.

FIG. 13 shows a typical installation of a cross-connection termination and illustrates in FIGS. 13A and 13B how these connections may be effected by the use of a single-ended terminal or binding post as shown in FIG. 13A or the double-ended terminal or binding post as shown in FIG. 13B.

In FIGS. 15 and 15A, I have disclosed my novel type of connector used in a cable distribution termination wherein individual lines IL and IL' are tapped off the main cable MC by means of panel mounted terminals as shown in FIG. 15A.

Figure 16:
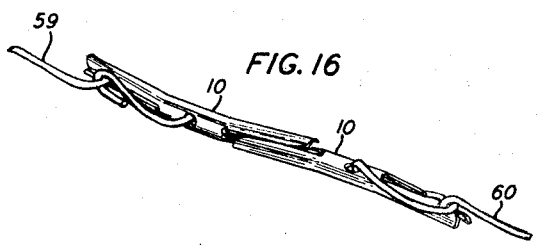
FIG. 16 is a fragmentary perspective view and shows how two of the connectors of my invention may be coupled together to provide a detachable joint between two insulated conductors.

In FIG. 16 I have shown how two of my connectors 10—10 as shown in FIGS. 1 and 1A may be coupled together to provide a detachable joint between the conductors 59 and 60.

While I have shown and described the preferred embodiment of my invention, it is understood that various changes and modifications may be made therein without departing from the scope of the invention.

What is claimed is:

1. A connector for insulated electrical conductors comprising an elongated tapered resilient metallic body member having a bowed configuration and a substantially arcuate cross section, a longitudinal slit extending from the end thereof and terminating some distance from said end, said slit having opposed edge portions for rupturing the insulation on the conductors as they are forced therebetween for establishing electrical contact therewith.

2. A connector for insulated electrical conductors comprising an elongated tapered resilient metallic body member having a bowed configuration and a substantially arcuate cross section, a longitudinal slit extending from the end thereof and terminating some distance from said end, said slit having converging and diverging opposed edge portions for rupturing the insulation on the conductors as they are forced therebetween for establishing electrical contact therewith.

3. A connector for insulated electrical conductors comprising an elongated tapered resilient metallic body member having a bowed configuration and a substantially arcuate cross section, a longitudinal slit extending from the end thereof and terminating some distance from said end, said slit having converging and diverging opposed edge portions in contact with each other for rupturing the insulation on the conductors as they are forced therebetween for establishing electrical contact therewith.

4. A connector for insulated electrical conductors comprising an elongated tapered resilient metallic body member having a bowed configuration and a substantially arcuate cross section, and an aperture centrally disposed with respect to the ends thereof, a longitudinal slit extending from the end thereof and terminating some distance from said end, said slit having converging and diverging opposed edge portions for rupturing the insulation on the conductors as they are forced therebetween for establishing electrical contact therewith.

5. A connector for insulated electrical conductors comprising an elongated tapered resilient metallic body member having a bowed configuration and a substantially arcuate cross section, a longitudinal slit extending from each end thereof and terminating some distance from said end, said slit having converging and diverging opposed edge portions in contact with each other for rupturing the insulation on the conductors as they are forced therebetween for establishing electrical contact therewith.

6. A connector for joining an insulated electrical conductor to another conductor, comprising a bowed metallic tapered body member of resilient material and having a plurality of means for connecting to electrical conductors, at least one of said means comprising an elongated portion, substantially arcuate in cross section, having a longitudinal slit extending from the end thereof and terminating some distance from said end, said slit having converging and diverging opposed edge portions for rupturing the insulation on the conductors as they are forced therebetween for establishing electrical contact therewith.

References Cited in the file of this patent

UNITED STATES PATENTS

| | | |
|---|---|---|
| 394,817 | Blanchard | Dec. 18, 1888 |
| 2,215,366 | Alden | Sept. 17, 1940 |
| 2,501,187 | Oortgijsen | Mar. 21, 1950 |
| 2,583,530 | Hasselbohm | Jan. 29, 1952 |
| 2,651,768 | Oortgijsen | Sept. 8, 1953 |
| 2,706,804 | Ziebell | Apr. 19, 1955 |
| 2,828,474 | Fox | Mar. 25, 1958 |
| 2,892,175 | Frey | June 23, 1959 |

FOREIGN PATENTS

| | | |
|---|---|---|
| 13,162 | Great Britain | June 1, 1911 |
| 615,737 | Great Britain | Jan. 11, 1949 |